United States Patent
Arutaki

[19]

[11] Patent Number: 6,151,303
[45] Date of Patent: Nov. 21, 2000

[54] METHOD OF ASYNCHRONOUS TRANSFER MODE (ATM) SWITCHING AND AN ATM SWITCHING EQUIPMENT

[75] Inventor: Akira Arutaki, Tokyo, Japan

[73] Assignee: NEC Corporation, Tokyo, Japan

[21] Appl. No.: 08/869,908

[22] Filed: Jun. 5, 1997

[30] Foreign Application Priority Data

Jun. 6, 1996 [JP] Japan ................................. 8-144107

[51] Int. Cl.⁷ .............................. H04J 1/16; H04L 12/28
[52] U.S. Cl. ........................................... 370/236; 370/395
[58] Field of Search ................................... 370/229, 230, 370/232, 235, 395, 399, 409, 410, 412, 417, 394, 414, 416, 450, 236, 231

[56] References Cited

U.S. PATENT DOCUMENTS

| | | | |
|---|---|---|---|
| 5,515,359 | 5/1996 | Zheng | 370/235 |
| 5,528,591 | 6/1996 | Lauer | 370/236 |
| 5,633,867 | 5/1997 | Ben-Num et al. | 370/412 |
| 5,689,499 | 11/1997 | Hullett et al. | 370/235 |
| 5,737,313 | 4/1998 | Kolarov et al. | 370/234 |
| 5,745,489 | 4/1998 | Diaz et al. | 370/395 |
| 5,754,530 | 5/1998 | Awedeh et al. | 370/395 |
| 5,777,984 | 7/1998 | Gun et al. | 370/230 |
| 5,784,358 | 7/1998 | Smith et al. | 370/230 |
| 5,802,040 | 9/1998 | Park et al. | 370/232 |
| 5,854,783 | 12/1998 | Kaganoi | 370/232 |

FOREIGN PATENT DOCUMENTS

| | | |
|---|---|---|
| 58-106933 | 6/1983 | Japan . |
| 64-29146 | 1/1989 | Japan . |
| 3-48558 | 3/1991 | Japan . |
| 3-82244 | 4/1991 | Japan . |
| 6-62042 | 3/1994 | Japan . |

OTHER PUBLICATIONS

N. Wakamiya et al., "Fair Bandwidth allocation in FRP–based ATM local area networks", pp. 627–638, IEICE Trans. Communication, vol. E79–B, No. 5, May 1996.

"Traffic Management Sub–Working Group", *ATM Forum*, Nov. 1996, pp. 1 and 2.

"ATM Best Effort", *The Institute of Electronics, Information and Communication Engineers, Technical Report of IEICE*, Sep. 1994, pp. 21–26.

*Primary Examiner*—Chau Nguyen
*Assistant Examiner*—Chiho Andrew Lee
*Attorney, Agent, or Firm*—Young & Thompson

[57] ABSTRACT

A fast reservation protocol type ATM switching method and ATM switching equipment which are capable to suppress deterioration in transmission efficiency by reducing a cell discarding rate even in case of transmitting a huge ATM cell burst is provided. A buffer monitoring circuit monitors the number of idle slots in a buffer of an ATM switching equipment. A resource management (RM) cell processing circuit compares the number of idle slots with the total number of cells consisting an ATM cell burst contained in an RM cell locating at the top of the ATM cell burst stream when receiving the ATM cell burst from an ATM subscriber equipment. If the number of idle slots is not available for storing all cells in the ATM cell burst, the RM cell processing circuit instructs a gate circuit to pass same number of cells as idle slots available in the buffer and discard the rest of cells, and transmits a RM cell, containing information of number of cells to be retransmitted, to the ATM subscriber equipment for requesting retransmission.

5 Claims, 4 Drawing Sheets

METHOD OF ASYNCHRONOUS TRANSFER MODE (ATM) SWITCHING AND AN ATM SWITCHING EQUIPMENT

BACKGROUND OF THE INVENTION

1. Field of the Invention

The present invention relates to a fast reservation protocol (FRP) type asynchronous transfer mode (ATM) switching process, and particularly to an ATM switching method and an ATM switching equipment which can efficiently store receiving ATM cells in a buffer and can transmit them.

2. Description of the Related Art

A fast reservation protocol (hereinafter referred to as FRP) adopts a transmission system in which ATM cells through an ATM subscriber's line are transmitted consecutively as in a burst mode, as shown in FIG. 3(A). An ATM cell burst is composed of a resource management cell (RM cell) arranged at the top of the burst stream and the succeeding plural cells. The RM cell contains an attribute information of the burst, such information as the total number of cells in the burst, and the information of the total number of cells in the burst is utilized for control of storing the cells in a buffer in the ATM switching equipment.

FIG. 4 is a block diagram showing a fundamental composition of an FRP type ATM switching equipment according to the prior art. In FIG. 4, the FRP type ATM switching equipment is mainly composed of an ATM subscriber's line 21, an RM cell processing circuit 22 which is comprising a control circuit 26 and a gate circuit 27 for processing an RM cell received through the ATM subscriber's line 21, a multiplexer circuit (MUX) 23, a buffer 24 for storing ATM cells to be transmitted, a buffer monitoring circuit 25.

Operation of the above-mentioned ATM switching equipment is described in the following with reference to FIG. 3(A).

First, a receiving RM cell (1) is received by the ATM switching equipment. In the ATM switching equipment, the control circuit 26 of the RM cell processing circuit 22 extracts information of the total number of cells in the ATM cell burst being arrived which is an attribute information stored in the receiving RM cell (1). On the other hand, the ATM switching equipment always monitoring its own receiving capacity available by the buffer monitoring circuit. The buffer monitoring circuit 25 detects number of available idle slots in the buffer 24 and informs the detected result to the control circuit 26 of the RM cell processing circuit 22. Then, the control circuit 26 compares the extracted information, the total number of cells in the ATM cell burst being received, with its own receiving capacity, number of available idle slots in the buffer 24, informed by the buffer monitoring circuit 25. When the comparing result indicates that the buffer 24 has enough capacity to store all the receiving cells (2) to (7) in the receiving or incoming ATM cell burst, the control circuit 26 opens the gate 27 to store the receiving cells in the buffer 24 through the multiplexer circuit 23. However, when the comparing result indicates that the buffer 24 does not have enough capacity to store all the receiving cells, the control circuit 26 discards all of the receiving cells (2) to (7) by closing the gate circuit 27.

In such a way, a receiving method of receiving cells in an existing switching equipment has performed an alternative control which is either of reception and discarding of received cells according to relation between the total number of ATM cells in the burst and the number of idle slots available in the buffer.

In a conventional FRP type ATM switching equipment, in the case that the total number of cells in a receiving ATM cell burst is great, the possibility that the number of idle slots available in the buffer is greater than the total number of cells in the burst becomes low, and as the result, discarding of a receiving ATM cell burst is liable to happen.

In the case that the total number of cells in an ATM cell burst to be received is greater than the number of idle slots in the buffer, all cells in the burst are discarded. Therefore, the transmission side of the ATM cell burst needs to retransmit the same ATM cell burst, and this causes a discarding rate of cells to increase and also causes the transmission efficiency to be deteriorated.

Particularly, in the case of transmitting data having a great amount of information, since a huge ATM cell burst is processed, it is likely that a high-speed data transmission cannot be performed due to discarding of cells.

SUMMARY OF THE INVENTION

An object of the present invention is to provide a fast reservation protocol type ATM switching method and a fast reservation protocol type ATM switching equipment which are capable of performing a high-speed transmission of a great amount of information by reducing a cell discarding rate.

A fast reservation protocol type ATM switching method of using a resource management cell being located at the top of an ATM cell burst stream transmitted from an ATM subscriber apparatus, the method comprises the following steps:

(1) including information of a total number of cells consisting the ATM cell burst in the resource management cell when the ATM cell burst being transmitted;

(2) discriminating the resource management cell in the ATM cell burst and extracting the information of the total number of cells in the ATM burst when the ATM cell burst is received;

(3) detecting a number of idle slots available for storing cells of the ATM cell burst in a buffer of an ATM switching equipment;

(4) comparing the total number of cells in the ATM cell burst with the number of idle slots in the buffer of the ATM switching equipment;

(5) storing the same number of cells in the ATM cell burst as the number of idle slots available in the buffer if the total number of cells in the ATM cell burst is greater than the number of idle slots available in the buffer, and discarding remaining cells for which no idle slot in the ATM cell buffer is available;

(6) notifying storing state of cells in the buffer to the ATM subscriber apparatus; and (7) retransmitting cells not stored in the buffer in the previous ATM cell burst from the ATM subscriber apparatus.

The information of the storing state of cells in the buffer to be given to the ATM subscriber apparatus is a cell number of the last cell stored in the buffer, and this information is transmitted by included in a resource management cell which is generated and transmitted by the ATM switching equipment.

A fast reservation protocol type ATM switching equipment of using a resource management cell being located at the top of an ATM cell burst stream and including information of a total number of cells consisting the ATM cell burst transmitted from an ATM subscriber apparatus, the ATM switching equipment comprises the following elements:

(1) a buffer for storing cells of an ATM cell burst received;

(2) a buffer monitoring circuit for monitoring a number of idle slots in the buffer available for storing cells; and (3) a resource management cell processing circuit for discriminating a resource management cell in an ATM cell burst stream being received, extracting information of a total number of cells consisting the ATM cell burst from the resource management cell, comparing the total number of receiving cells in the ATM burst and the number of idle slots available in the buffer with each other, determining the number of cells to be stored and passing cells to the buffer as the result of comparison, discarding rest of cells and notifying number of cells to be retransmitted from the ATM subscriber apparatus.

The resource management cell processing circuit comprises the following circuits:

(1) a resource management cell detecting circuit for discriminating a resource management cell in an ATM cell burst stream being received, and extracting information of a total number of cells consisting the ATM cell burst from the resource management cell;

(2) a comparing circuit for comparing the total number of receiving cells in the ATM burst and the number of idle slots available in the buffer with each other, as the result of comparison, determining the number of cells to be stored in the buffer, and instructing a gate to pass determined number of cells and discarding the rest of cells;

(3) a resource management cell generating circuit, for generating a resource management cell for notifying number of cells to be retransmitted from the ATM subscriber apparatus.

DETAILED DESCRIPTION OF THE PREFERRED EMBODIMENT

An embodiment of the present invention is described in the following with reference to FIGS. 1 and 2.

Figure 1:
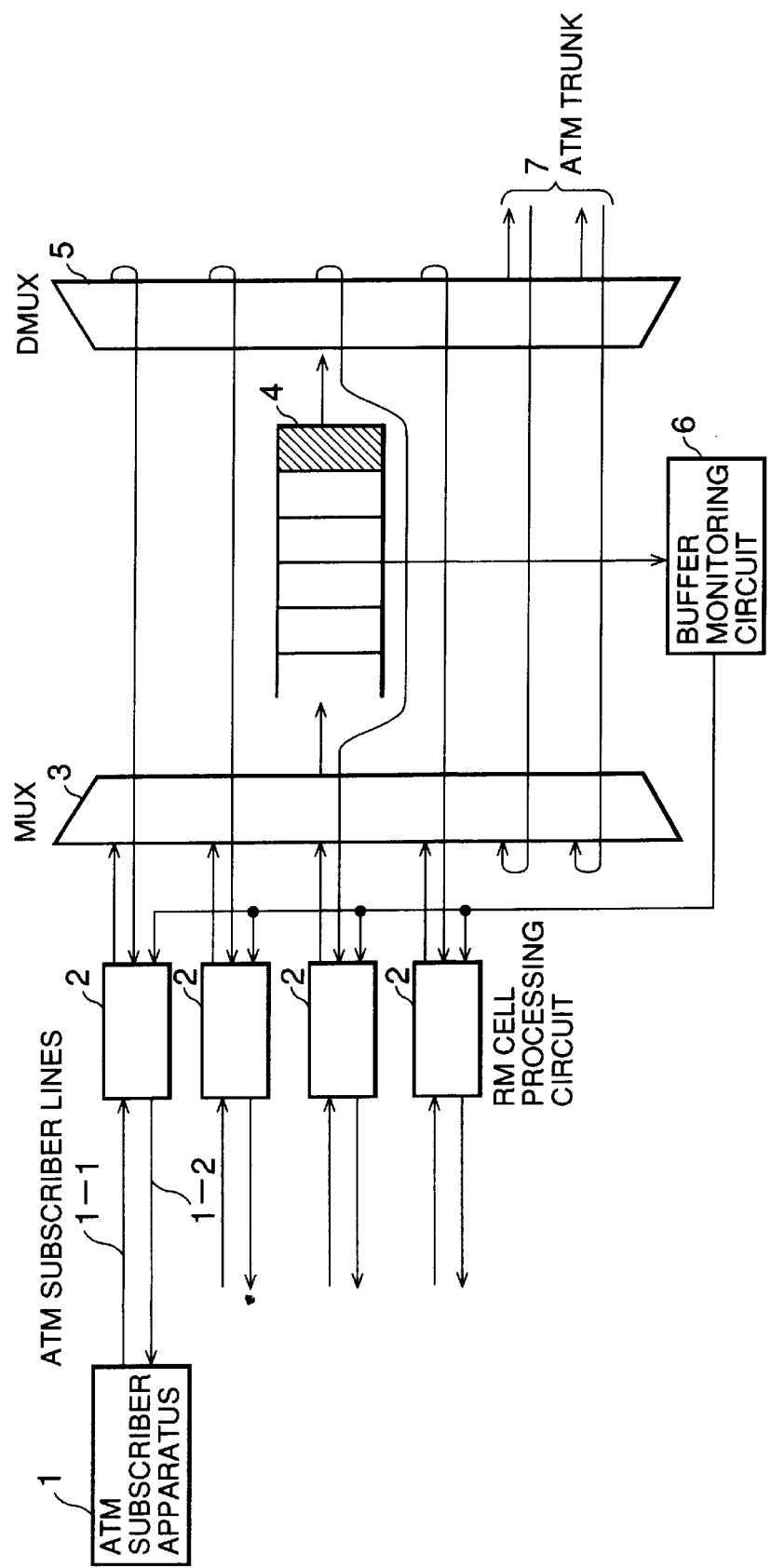
FIG. 1 is a block diagram for explaining an ATM switching equipment of an embodiment of the present invention.
Figure 2:
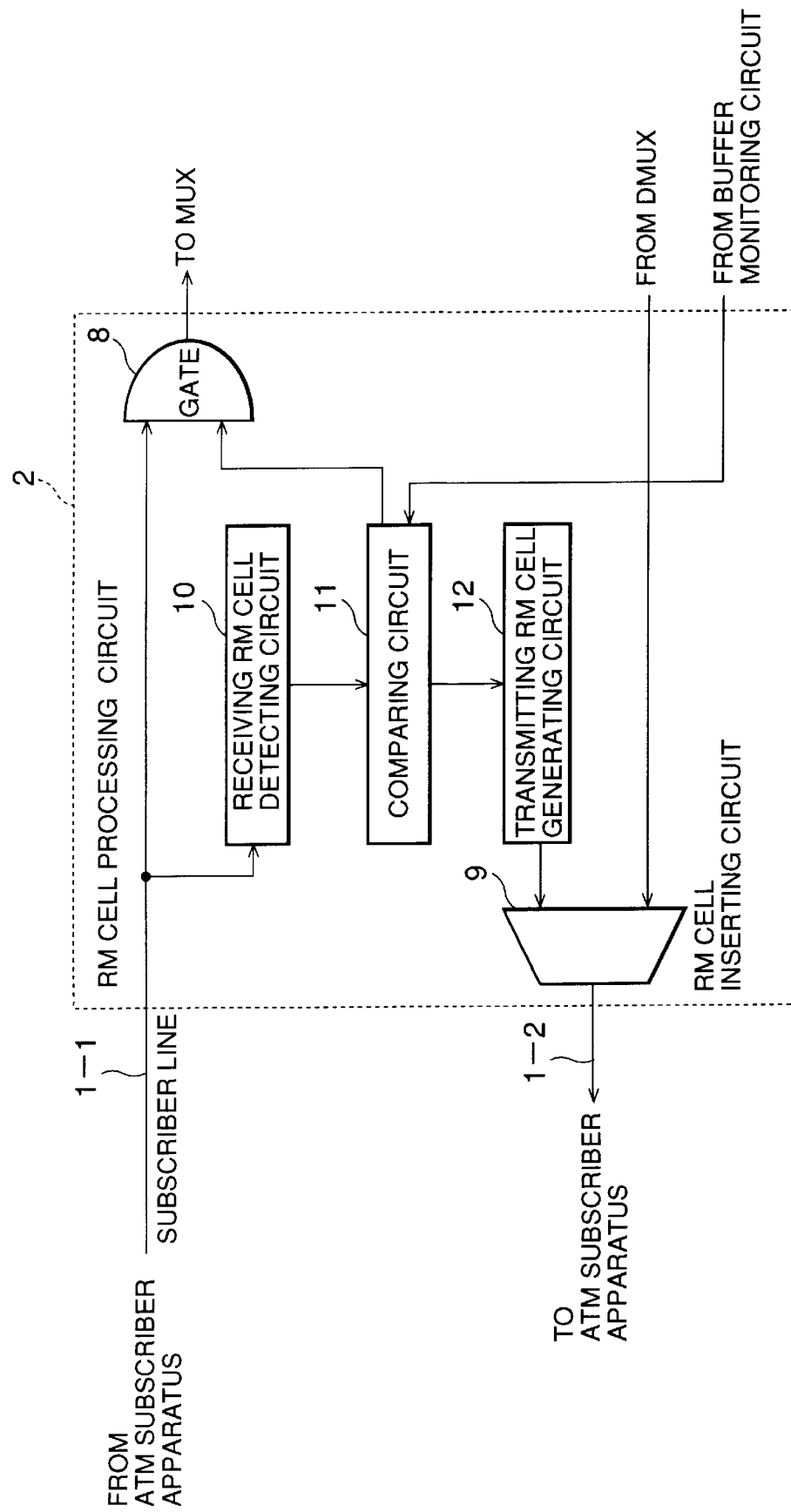
FIG. 2 is a block diagram for explaining composition of an RM processing circuit of this embodiment.

FIGS. 1 and 2 are block diagrams for showing a fundamental composition of a system including an FRP type ATM switching equipment of this embodiment. As shown in FIG. 1, the whole system is composed of an ATM subscriber apparatus 1, ATM subscriber's lines 1—1 (from an ATM subscriber apparatus to an ATM switching equipment: receiving side) and 1-2 (from an ATM switching equipment to an ATM subscriber apparatus: transmission side), RM cell processing circuit 2 corresponding to each ATM subscriber apparatus and processing a receiving RM cell through a subscriber's line, a multiplexer circuit MUX3, a buffer 4 which stores receiving cells, a demultiplexer circuit 5, a buffer monitoring circuit 6, and an ATM trunk 7 (not shown).

As shown in FIG. 2, the RM cell processing circuit 2 is composed of a gate circuit 8 for gating a receiving cells input through the ATM subscriber's line 1—1 to the multiplexer circuit MUX3, an RM cell inserting circuit 9 for inserting a transmitting RM cell into a transmitting cell burst from the demultiplexer circuit DMUX5, a receiving RM cell detecting circuit 10, a comparing circuit 11, and a transmitting RM cell generating circuit 12.

Operation of this embodiment is described with reference to FIG. 1, FIG. 2 and a receiving ATM cell burst in FIG. 3(A).

The buffer monitoring circuit 6 provided in an ATM switching equipment has a function to always count the number of idle slots in the buffer 4 and outputs the number of counted idle slots to the comparing circuit 11 in each RM cell processing circuit 2. Now, when an ATM cell burst is received through an ATM subscriber's line 1—1, the receiving RM cell detecting circuit 10 in an RM cell processing circuit 2 connected to the subscriber's line detects the receiving RM cell which always arrives the first in the burst, and extracts and outputs information about the succeeding cells (2) to (7), especially total number of cells (2) to (7), indicated in this receiving RM cell to the comparing circuit 11. The comparing circuit 11 compares the number of the counted idle slots, which are available in the buffer 4, and the total number of cells in the burst with each other and outputs a control signal for controlling the gate 8 and the transmitting RM cell generating circuit 12 according to the result of comparison.

In case that the number of cells in the receiving ATM cell burst is equal to or less than the number of idle slots in the buffer 4, the comparing circuit 11 outputs a control signal to make all cells in the burst being arrived pass through the gate circuit 8 and thus the receiving cells are stored in the buffer 4 through the multiplexer circuit MUX3. On the other hand, in case that the total number of cells in the burst is greater than the number of idle slots available in the buffer 4, the comparing circuit 11 outputs a control signal to make only the same number of receiving cells as the idle slots pass through the gate circuit 8 and thus the same number of receiving cells as the idle slots are stored in the buffer 4 through the multiplexer circuit MUX3, and the remaining cells which are not allowed to pass due to no more idle slot in the buffer 4 is available are discarded by the gate circuit 8. For example, in case of the ATM cell burst in FIG. 3(A), the total number of cells in the burst is six and so when assuming that the number of idle slots in the buffer 4 is three, only the cells (2) to (4) are stored in the buffer 4 and the remaining cells (5) to (7) are discarded by closing the gate circuit 8.

Figure 3:
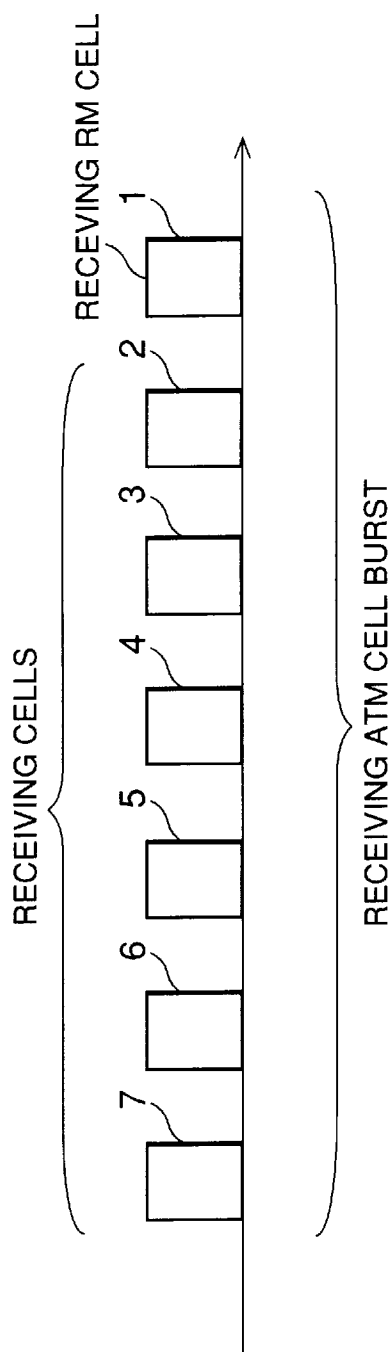
FIG. 3(A) is an example showing a timing chart of an ATM cell burst.
FIG. 3(B) is an example showing an RM cell format to be transmitted to an ATM subscriber equipment from an ATM switching equipment.
Figure 3:
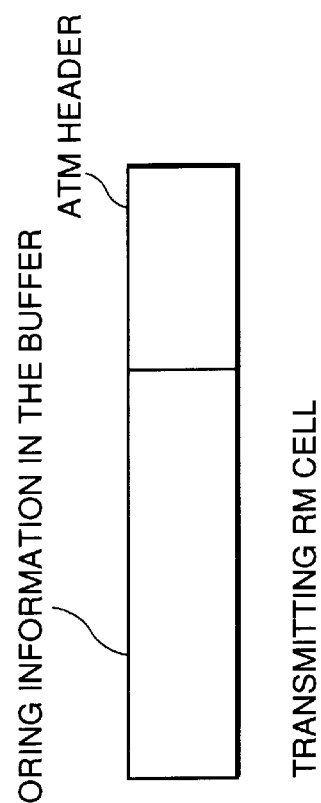
Figure 4:
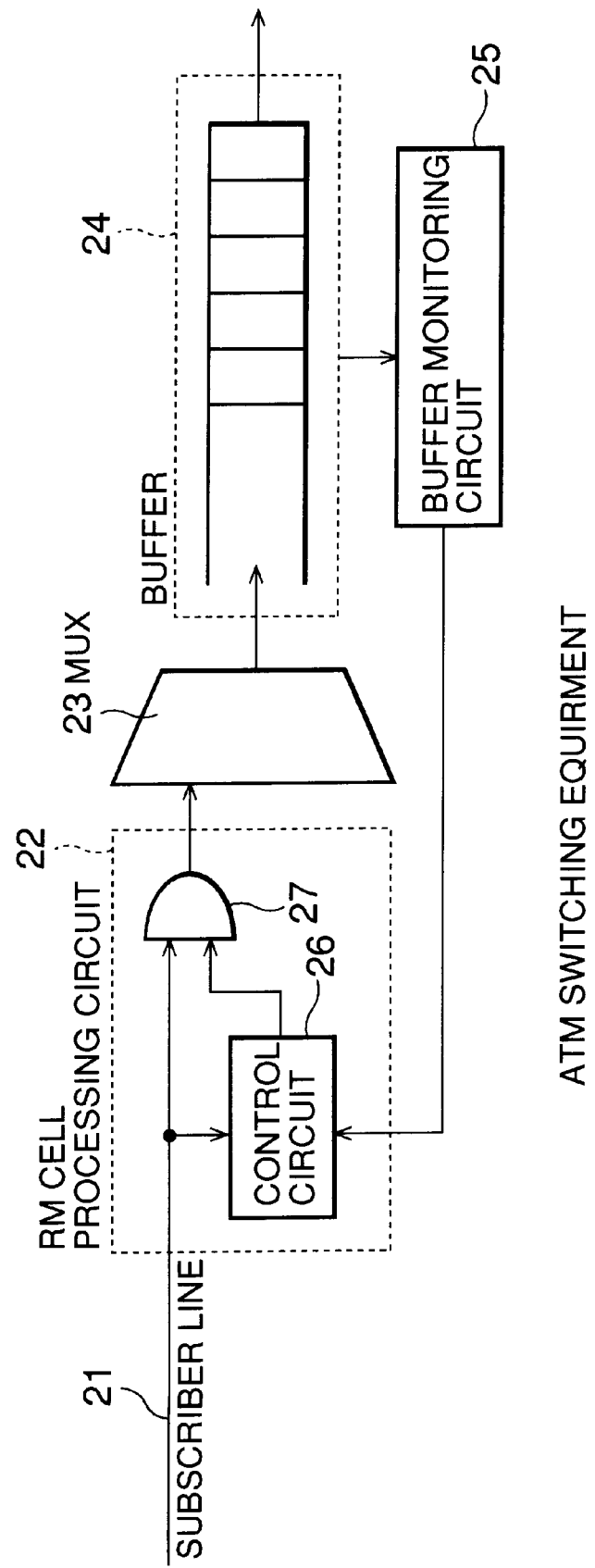
FIG. 4 is a block diagram for explaining an ATM switching equipment of the prior art.

And the transmitting RM cell generating circuit 12 generates a transmitting RM cell whose format is as shown in FIG. 3(B) through control from the comparing circuit 11, and transmits a receiving state of the ATM cell burst to an ATM subscriber apparatus through the subscriber's line 1-2. In case that the ATM switching equipment has stored the whole of the ATM cell burst in the buffer 4, the transmitting RM cell generating circuit 12 indicates in the transmitting RM cell that all of the cells (2) to (7) have been surely received by the ATM switching equipment, and the RM inserting circuit 9 inserts said transmitting RM cell into a transmitting ATM cell burst and transmits it to an ATM subscriber apparatus through the subscriber's line 1-2.

And in case that only some of cells of the ATM cell burst have been stored in the buffer 4, the number of cells having been received by the ATM switching equipment is indicated in a transmitting RM cell generated by the transmitting RM cell generating circuit 12 and the transmitting RM cell is transmitted to the ATM subscriber apparatus through the ATM subscriber's line 1-2.

The ATM subscriber apparatus 1 controls transmission of the next ATM cell burst by reading information showing a cell storing state in the buffer 4 of the transmitting RM cell sent from the ATM switching equipment. In case that the cells in the previous transmitted ATM cell burst have been surely stored in the buffer 4 of the ATM switching equipment, the next new ATM cell burst is transmitted. In case that the cells in the previous transmitted ATM cell burst have not been stored in the buffer 4 of the ATM switching equipment, the same ATM cell burst is transmitted again. And in case that some of the cells in the previous transmitted ATM cell burst have not been stored in the buffer 4 of the ATM switching equipment, the remaining cells are retransmitted by the ATM subscriber apparatus knowing the receiving state of the previous ATM burst.

In the above-mentioned embodiment, an example has been described where an ATM cell burst is divided into two portions and transmitted according to the number of idle slots in the buffer, but an ATM cell burst may be divided into three or more portions and transmitted according to the storage capacity of the buffer. In this case, the ATM switching equipment can surely transmit a huge ATM cell burst by storing the total number of cells in an ATM cell burst on the basis of its RM cell and transmitting a receiving cell number stored in the buffer in the end of each divided cell burst transmission to the ATM subscriber side each time. As an ATM cell transmission method from an ATM subscriber apparatus, a transmission method can be also adopted which transmits a cell storing and discarding state by adding an RM cell to the beginning of an ATM cell burst and storing the number of succeeding transmitting cells in the RM cell also on and after the second ATM cell burst transmission.

According to an FRP type ATM switching method, and an ATM switching equipment of the invention, in case that the number of cells in a ATM cell burst is greater than the number of idle slots in a buffer, since all cells in the cell burst are not discarded, the buffer can be effectively utilized and a discarding rate of transmitted cells can be kept low and moreover the transmission speed can be improved thanks to the decrease of cells to be discarded.

And a subscriber who transmits a great amount of information by means of an ATM cell burst can surely transmit cells corresponding to the capacity of idle, slots of the buffer, can decrease frequency in discarding of cells in a transmitting ATM cell burst, and can reduce to the minimum a signal processing and a transmission control sequence for transmission of extra ATM cells.

According to a fast reservation protocol (FRP) type ATM switching equipment of the invention, since it is not necessary to secure a sufficient capacity of the buffer according to the number of cells in an ATM cell burst from a subscriber apparatus, its equipment configuration can be simplified.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be constructed as included therein.

What is claimed is:

1. An ATM switching method applying a fast reservation protocol in which a resource management cell located at the head of an ATM cell burst stream is transmitted from an ATM subscriber apparatus, said method comprising steps of:

including information of a total number of cells in the ATM cell burst in the resource management cell when the ATM cell burst is transmitted from the ATM subscriber apparatus;

discriminating the resource management cell in the ATM cell burst and extracting the information of the total number of cells in the ATM burst when the ATM cell burst is received at an ATM switching equipment;

detecting a number of idle slots available for storing cells of the ATM cell burst in a buffer of the ATM switching equipment;

comparing the total number of cells in the ATM cell burst with the number of idle slots in the buffer of the ATM switching equipment;

storing the same number of cells in the ATM cell burst as the number of idle slots available in the buffer if the total number of cells in the ATM cell burst is greater than the number of idle slots available in the buffer, and discarding remaining cells for which no idle slot in the ATM cell buffer is available;

at the ATM switching equipment notifying a storing state of cells in the buffer to the ATM subscriber apparatus; and retransmitting cells not stored in the buffer beginning with a next cell following a last cell stored in the buffer in the previous ATM cell burst from the ATM subscriber apparatus.

2. The ATM switching method of claim 1, wherein the information of storing state of cells in the buffer to be given to the ATM subscriber apparatus is a cell number of the last cell stored in the buffer.

3. The ATM switching method of claim 2, wherein the information of the cell number of the last cell stored in the buffer is transmitted by a resource management cell being generated and transmitted by the ATM switching equipment.

4. An ATM switching equipment using a fast reservation protocol with a resource management cell located at the head of an ATM cell burst stream and including information of a total number of cells consisting the ATM cell burst transmitted from an ATM subscriber apparatus, said ATM switching equipment comprising;

a buffer for storing cells of an ATM cell burst received;

a buffer monitoring circuit for monitoring a number of idle slots in the buffer available for storing cells; and a resource management cell processing circuit for discriminating a resource management cell in an ATM cell burst stream being received, extracting information of a total number of cells in the ATM cell burst from the resource management cell, comparing the total number of incoming cells in the ATM burst and the number of idle slots available in the buffer with each other, determining the number of cells to be stored and passing cells to the buffer as the result of comparison, discarding rest of cells and issuing a notification to the ATM subscriber apparatus of a number of cells to be retransmitted by the ATM subscriber apparatus.

5. An ATM switching equipment using a fast reservation protocol with a resource management cell located at the head of an ATM cell burst stream and including information of a total number of cells consisting the ATM cell burst transmitted from an ATM subscriber apparatus, said ATM switching equipment comprising;

a resource management cell detecting circuit for discriminating a resource management cell in an ATM cell burst stream being received, and extracting information of a total number of cells in the ATM cell burst from the resource management cell;

a buffer for storing cells of the ATM cell burst received;

a buffer monitoring circuit for monitoring a number of idle slots in the buffer available for storing cells;

a comparing circuit for comparing the total number of incoming cells in the ATM burst and the number of idle slots available in the buffer with each other, as a result of the comparison, determining the number of cells to be stored in the buffer, and instructing a gate to pass the determined number of cells and discarding the rest of the cells;

a resource management cell generating circuit, for generating a resource management cell for providing a notification to the ATM subscriber unit of the number of cells to be retransmitted by the ATM subscriber apparatus.

* * * * *